Figure 1:
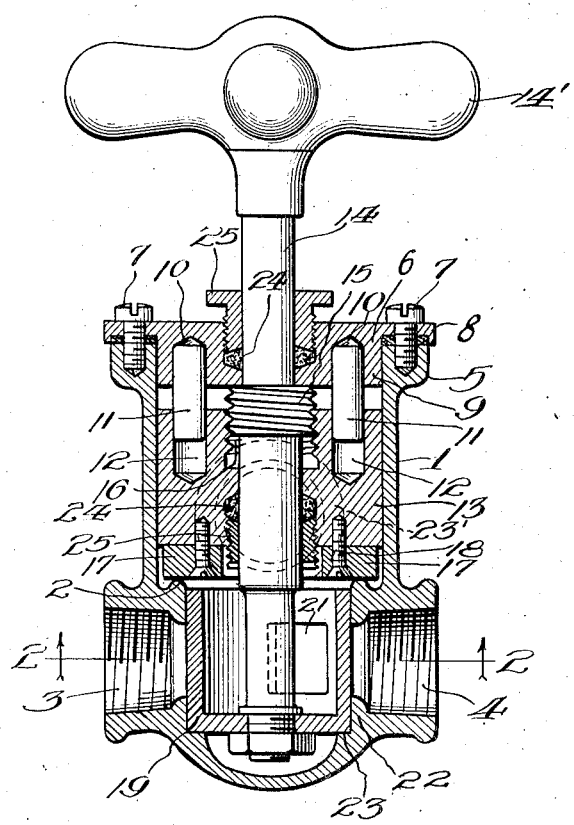

Nov. 2, 1926.

W. J. FROST

VALVE

Filed June 26, 1926

1,605,107

Witness:

Inventor:
Walter J. Frost.

Patented Nov. 2, 1926.

1,605,107

UNITED STATES PATENT OFFICE.

WALTER J. FROST, OF KENOSHA, WISCONSIN.

VALVE.

Application filed June 26, 1926. Serial No. 118,727.

This invention relates to a valve for controlling the discharge of hot or cold water or both.

The primary object of the invention is to provide a structure of extreme simplicity, and one in which a common valve stem is employed for controlling directly the hot and cold water.

A further object of the invention is to provide a valve which is suitable for showers, bath tubs, sinks, lavatories, or the like, which comprises the combination of a non-rising valve stem controlling and reciprocating a non-rotatable disk valve and a rotatable cup-shaped ported valve.

The present invention eliminates the cumbersome, expensive and complicated appliances now on the market and substitutes a simple, inexpensive structure which functions directly with certainty and ease.

Figure 2:
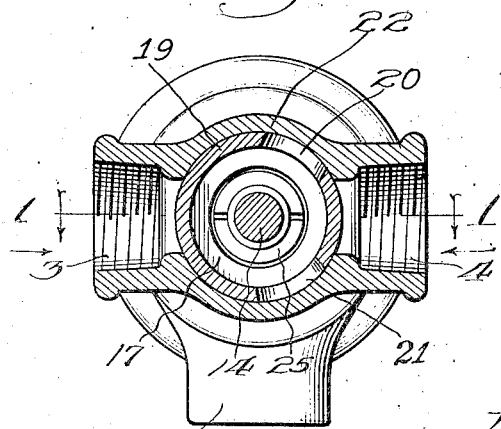

In the drawings:

Fig. 1 represents a vertical sectional view of the valve mechanism taken on line 1—1 of Fig. 2.

Fig. 2 discloses a cross sectional view taken on line 2—2 of Fig. 1.

Referring now more specifically to the drawings, 1 designates a valve chamber which is preferably integrally cast to provide an upstanding valve seat 2, and hot and cold water inlets, respectively, 3 and 4. This valve chamber has a thickened flanged portion 5 to which is secured the cover plate 6, by means of fastening devices 7. The cover plate 6 has a flanged portion 8 supported on the flange 5 aforesaid and is furthermore provided with a depending portion 9 fitting tightly within the confines of the inner surface of the chamber 1 at its upper end. The cover 6 furthermore may be provided with recesses 10 for receiving the pins 11, which pins are loosely engaged in recesses 12 located within the body of the disk valve 13. It is obvious that any other means may be provided to prevent rotation of the disk valve 13. The valve stem 14 is exteriorly threaded as at 15 and meshes with complemental screw threads 16 within the disk valve body aforesaid. It will thus be seen upon the rotation of the valve stem 14 that the disk valve moves vertically but is prevented from rotation by virtue of the pins 11. The disk valve may have attached to its lower face the composition disk 17 by means of elements 18, functioning to seat upon the part 2 of the valve chamber when in its closed position, the disk preferably being flexible enough to permit a tight seal between disk valve 13 and seat 2.

Secured to the stem at the lower portion thereof is a ported valve 19 which is substantially cup-shaped and is ported as at 20 and 21. This ported member 19 has an easy turning non-binding loose fit within the casing 22 of the chamber 1 and is adapted for free rotatable movement therein. This cup valve is journalled and is rotatably supported by the lower portion of the casing by means of the stepped surface 23.

From the foregoing, it will be noted that upon a rotary movement being imparted to the stem 14 by manipulating handle 14', the disk valve will be moved upwardly, but without causing a rising movement of the stem. The rotation of the stem will likewise control the cup ported member 19 to admit directly either hot or cold water through the inlets 3 or 4 through the ports 20 or 21. Furthermore, if desired, regulated amounts of hot and cold water, can be introduced by simultaneously bringing portions of the ports 20 and 21 into register with the direct inlets 3 and 4, the water being mixed within the cup-shaped ported valve 19, and it is obvious that by manipulating the stem 14, the member 19 can be rotated to secure a mixture of hot and cold water of the desired temperature. The water thus admitted rises upwardly around the disk valve and through the outlet 23'.

If desired, suitable packings 24 for the stem 1 may be employed, which packing can be controlled by the elements 25.

It will be obvious that any water leaking around the ported valve, when the same is in closed position, will be prevented from discharging by virtue of the disk valve. It will furthermore be obvious that the rotation of the stem 14 will simultaneously cause reciprocation of the disk valve, without rising movement of the stem and a rotary movement of the cup valve for admitting either hot or cold water, or both.

I claim as my invention:

1. A mixing device for hot and cold water comprising a housing, a non-rising stem journalled in said housing, said stem being exteriorly threaded, a disk valve having interior threads meshing with the threads of the stem, means for preventing rotation of the disk valve during its reciprocatory movement, a seat for said disk valve, a ported direct inlet valve carried by said valve stem, and adapted for rotary movement without reciprocation, said housing being provided with means for introducing hot and cold water directly to said ported valve, said rotary valve being adapted for selective registration with said inlets.

2. A mixing device comprising a casing having a plurality of inlets, an outlet for said casing, a non-rising stem mounted within said casing, a non-rotating disk valve reciprocable upon rotation of said stem, said casing being provided with a valve seat for the disk valve when it is in its closed position, a top for said casing, said top and disk valve having communicating recesses, pins mounted within said recesses for preventing rotation of the disk valve during its reciprocatory movement, a cup valve rigidly secured to the lower extremity of said valve stem and adapted upon rotation for direct selective communication with said inlets.

3. A mixing device comprising a casing having inlets and an outlet, a non-rising valve stem within said casing, a non-rotating valve reciprocable upon rotation of said valve stem, an inlet valve having a plurality of ports secured to said valve stem and rotatable therewith for selective registration with said inlets, said non-rotating valve being seated when the ports of the inlet valve are in non-registering position with respect to the inlets, to thereby prevent leakage escaping through the outlet of said valve casing.

4. A mixing device for hot and cold water comprising a valve casing, direct hot and cold water inlets for said casing, a non-rising valve stem, a non-rotatable disk valve reciprocable upon rotation of the valve stem, a cup-shaped inlet valve attached to said stem and rotatable without reciprocation therewith, said cup valve having ports in its side positioned at substantially right angles and adapted for registration with either of said hot or cold water inlets or both, a single discharge passage for said casing, said reciprocating disk valve being operative when said inlet valve is in its non-registering position with respect to the inlets of the valve casing.

WALTER J. FROST.